United States Patent [19]
Kaufmann, Jr.

[11] Patent Number: 5,515,674
[45] Date of Patent: May 14, 1996

[54] EXHAUST AFTERBURNER

[75] Inventor: John R. Kaufmann, Jr., 3716 Woodrow Ave., Pittsburgh, Pa. 15227

[73] Assignees: John R. Kaufmann, Jr.; Raymond J. Tarasi, both of Pittsburgh, Pa.

[21] Appl. No.: 296,687

[22] Filed: Aug. 26, 1994

[51] Int. Cl.$^6$ .................................................. F01N 3/30
[52] U.S. Cl. ................................................ 60/308; 60/324
[58] Field of Search ..................................... 60/308, 324

[56] References Cited

U.S. PATENT DOCUMENTS

| | | | |
|---|---|---|---|
| 3,543,510 | 12/1970 | Kaufmann, Jr. | 60/308 |
| 3,568,437 | 3/1971 | Briggs | 60/308 |
| 3,577,728 | 5/1971 | Von Brimer | 60/308 |
| 3,657,878 | 4/1972 | Kaufmann, Jr. | 60/319 |
| 4,909,034 | 3/1990 | Kakuta | 60/324 |

Primary Examiner—Douglas Hart
Attorney, Agent, or Firm—Webb Ziesenheim Bruening Logsdon Orkin & Hanson

[57] ABSTRACT

An exhaust afterburner for positioning in an exhaust duct or the like of an internal combustion engine through which partially reacted gases are circulated is disclosed. The exhaust afterburner includes a venturi induction member which has a circumferential array of radially extending apertures for inducting a reacting gas into the exhaust duct upon passage of the partially reacted gases therethrough. A housing surrounds a venturi induction member and includes a first air intake opening in communication with the apertures of the venturi induction member as well as a second air intake opening disposed adjacent to the inlet end of the venturi induction member. A bushing is positioned within the housing at the second air intake opening with the bushing having a circumferential array of radially extending apertures in fluid communication with the second air intake opening. A mechanism for relieving back pressure is provided within the exhaust afterburner positioned within the exhaust afterburner housing.

17 Claims, 4 Drawing Sheets

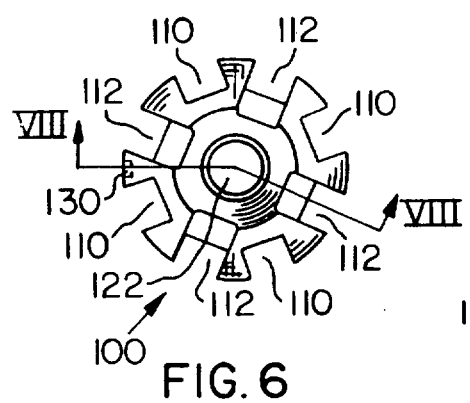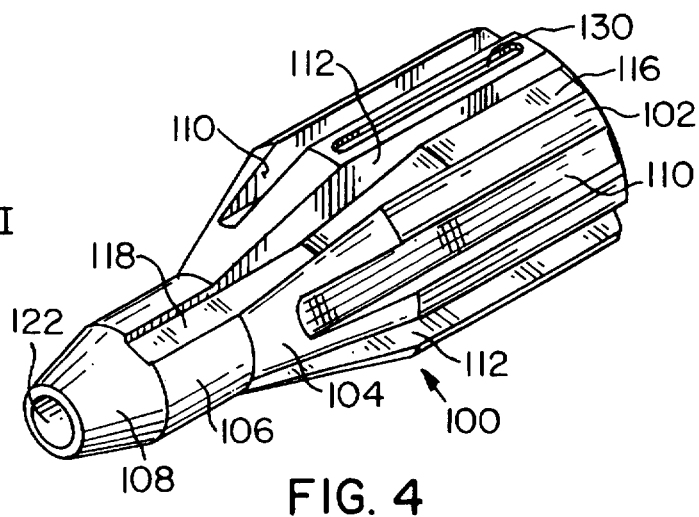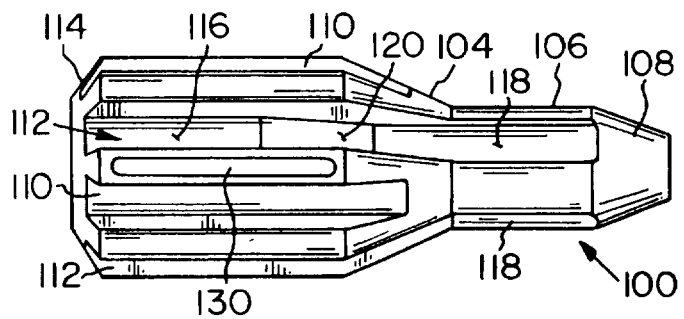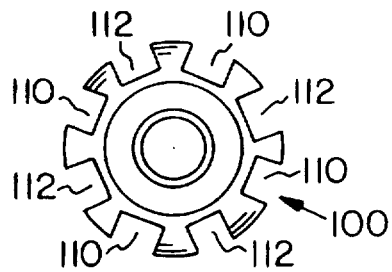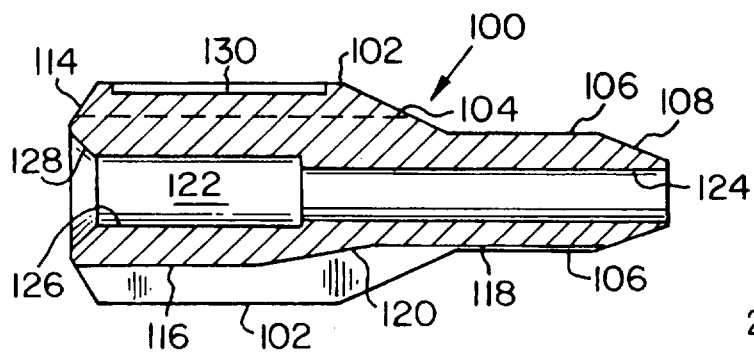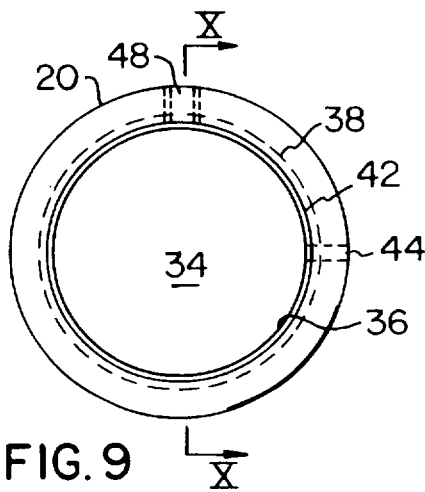

5,515,674

EXHAUST AFTERBURNER

BACKGROUND OF THE INVENTION

1. Field of the Invention

The present invention relates to exhaust conversion systems for completing the combustion of internal combustion engine exhaust gases, more particularly to such exhaust conversion systems further including a mechanism for relieving the back pressure within an exhaust afterburner of the exhaust conversion system.

2. Background Information

It is well-known that the various hydrocarbon fuels employed in internal combustion engines are not completely combusted therein. This unavoidable, incomplete combustion of fuels results in the generation of substantial quantities of unburned or partially burned hydrocarbons, carbon monoxide and other noxious waste gases. These are generally vented to the atmosphere through the exhaust system. Previously, many proposals have been advanced for combatting the pollutional effects caused by such noxious waste gases. Some have attempted to burn or oxidize the exhaust gases by thermal or catalytic conversion techniques. In the catalytic method, the exhaust gases leaving the engine are passed through a conversion unit in which a catalyst is suspended. Such units are rather bulky in construction and difficult to maintain in proper adjustment. Alternatively, in several thermal converting systems, an additional combustion chamber is required in the exhaust system of the engine. These may require additional fuel and an auxiliary ignition system in addition to auxiliary combustion air to accomplish the conversion of exhaust fumes. The use of such secondary fuel, of course, decreases the efficiency of the engine.

U.S. Pat. No. 3,657,878 to John Kaufmann, Jr., who is a joint inventor of the present application, discloses a conversion system for exhaust gases which is mounted in the exhaust of an internal combustion engine. The conversion system of the '878 patent includes a mechanism for inducting auxiliary combustion air directly into the vehicle exhaust system at a point where the heat of the exhaust system is generally sufficient to initiate and to drive the combustion of the exhaust substantially to completion. The difficulty with the prior art system disclosed in the '878 patent is that there is no control of the back pressure within the exhaust afterburner. The buildup of back pressure will decrease operative efficiency of the system. Additionally, the device disclosed in the '878 patent may not provide for sufficient auxiliary air into the afterburner or the ability to control the amount or location of air being input into the afterburner. The present invention overcomes the aforementioned drawbacks of the prior art.

SUMMARY OF THE INVENTION

The present invention provides an exhaust afterburner for an exhaust duct or the like of an internal combustion engine through which partially reacted gases are circulated. The exhaust afterburner includes a venturi induction member having a circumferential array of radially extending apertures for inducting a reaction gas into the exhaust duct upon the passage of the partially reacted gases therethrough. The venturi induction member includes an inlet and outlet end. A housing surrounds the venturi induction member and has an inlet and outlet end adapted to be connected to the exhaust duct of the internal combustion engine. The housing is provided with an air intake opening in fluid communication with the apertures of the venturi induction member and a second air intake opening disposed adjacent to the inlet end of the venturi induction member. A bushing is positioned in the housing at the second air intake opening with the bushing having a circumferential array of radially extending apertures in fluid communication with the second air intake opening. Additionally, the exhaust afterburner includes a slidable damping member positioned within the housing which may relieve back pressure within the exhaust afterburner.

The damping member is slidably mounted within the housing and is movable from a first position to a second position, whereby the first position denotes a minimum back pressure relief and the second position denotes a maximum back pressure relief by adjusting the flow through the exhaust afterburner. The damping member may include a substantially cylindrical body with a plurality of slots extending longitudinally along the cylindrical body. The damping member may include a tapered nose portion which extends through the venturi induction member. The damping member may further include a tapered middle portion wherein one-half of the slots of the damping member terminate at the tapered middle portion and wherein the other half of the slots taper at an angle substantially parallel to the tapered middle portion and extend longitudinally into the cylindrical portion of the damping member and into a tapered nose portion. The damping member may further include a circular cross-sectional opening extending through the longitudinal axis of the damping member, wherein the circular cross-sectional opening decreases as it extends from a grooved base end of the damping member to the tapered nose portion.

These and other advantages of the present invention will be clarified in the description of the preferred embodiment described in connection with the attached figures, wherein like reference numerals represent like elements throughout.

BRIEF DESCRIPTION OF THE DRAWINGS

FIG. 4 is a perspective view of the damping member of the exhaust afterburner of FIGS. 1–3;

FIG. 5 is a side view of the damping member shown in FIG. 4;

FIG. 6 is a front view of the damping member shown in FIG. 5;

FIG. 7 is a rear view of the damping member shown in FIG. 5;

FIG. 8 is a section view of the damping member shown in FIG. 6;

FIG. 9 is a front view of the first housing of the exhaust afterburner shown in FIGS. 1–3;

DESCRIPTION OF THE PREFERRED EMBODIMENT

Figure 1:
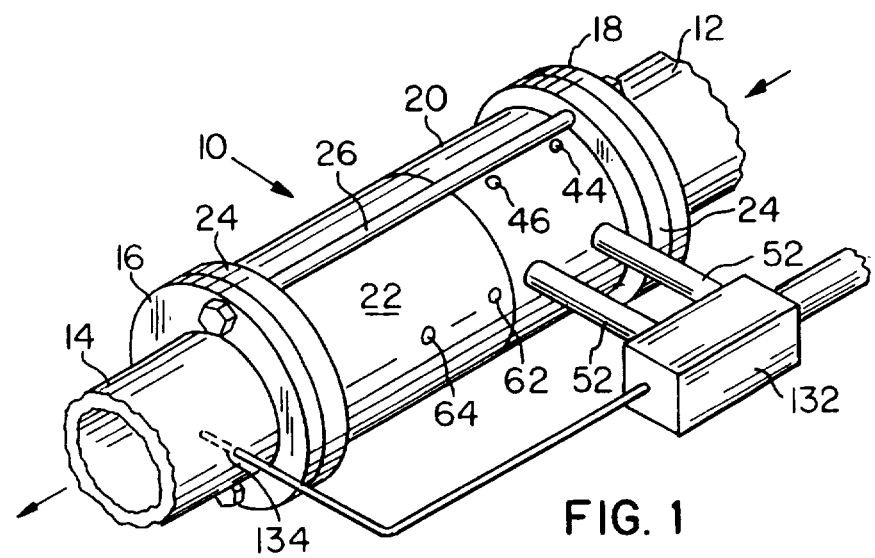
FIG. 1 is a perspective view of an exhaust afterburner according to the present invention.
Figure 2:
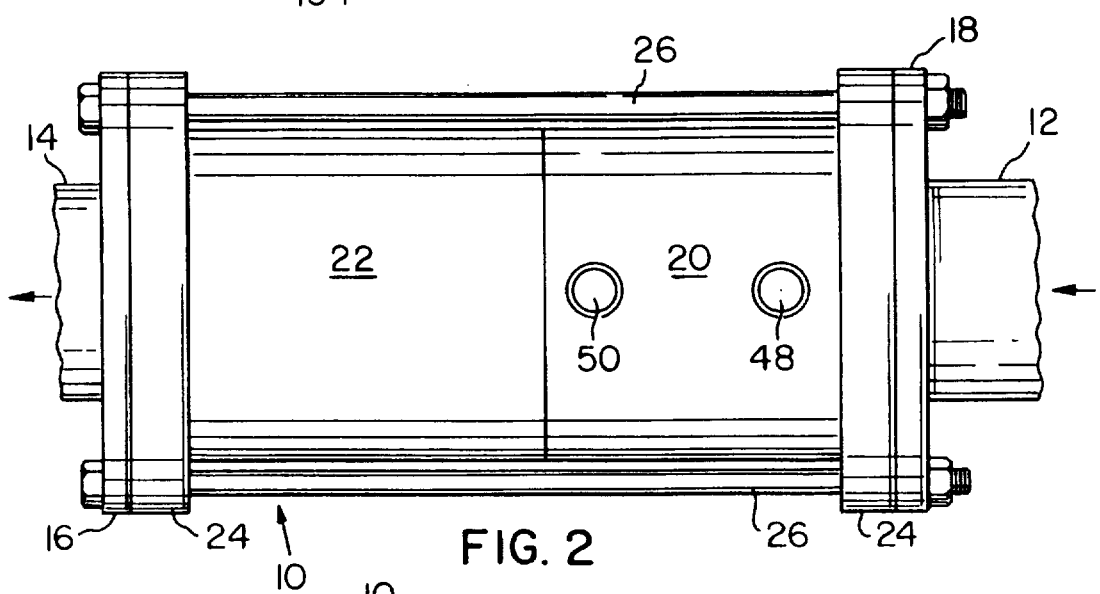
FIG. 2 is a side view of the exhaust afterburner shown in FIG. 1.
Figure 3:
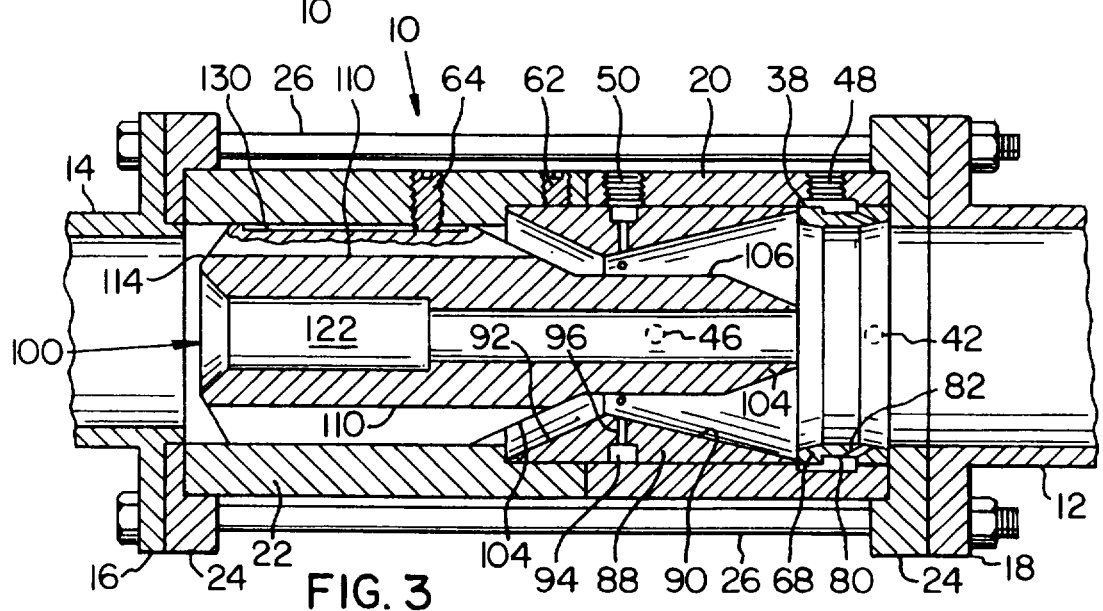
FIG. 3 is a sectional view of the afterburner shown in FIGS. 1 and 2.

FIGS. 1–3 of the drawings illustrate an exhaust afterburner 10 according to the present invention in conjunction with a standard internal combustion engine (not shown) having a conventional exhaust manifold 12 and tailpipe 14. Tailpipe 14 normally is secured directly to the outlet of the exhaust manifold 12. The tailpipe 14 is provided with a conventional connecting flange 16 and is spaced from the outlet of the exhaust manifold 12 which is also provided with a conventional connecting flange 18. The exhaust manifold 12 is provided with the usual number of inlet ports (not shown) whereby the exhaust manifold 12 is joined to the engine block in alignment with the individual cylinder exhaust ports. The direction of flow of exhaust through the exhaust system is denoted by flow arrows, as shown in FIG. 1. The exhaust afterburner 10 can be utilized in exhaust ducts of various types of systems. For example, the exhaust afterburner 10 can be employed in various types of furnace and oven ducts, and in conjunction with other process equipment. It is further contemplated that the exhaust gases need not be partially combustible in the ordinary sense of the term. Rather, the exhaust gases can be partially reacted in the general sense, and a reactant fluid can be inducted, as described below, which may include ambient air, oxygen or some other reactant fluid capable of converting the exhaust gases into nontoxic or innocuous fluids.

Figure 17:
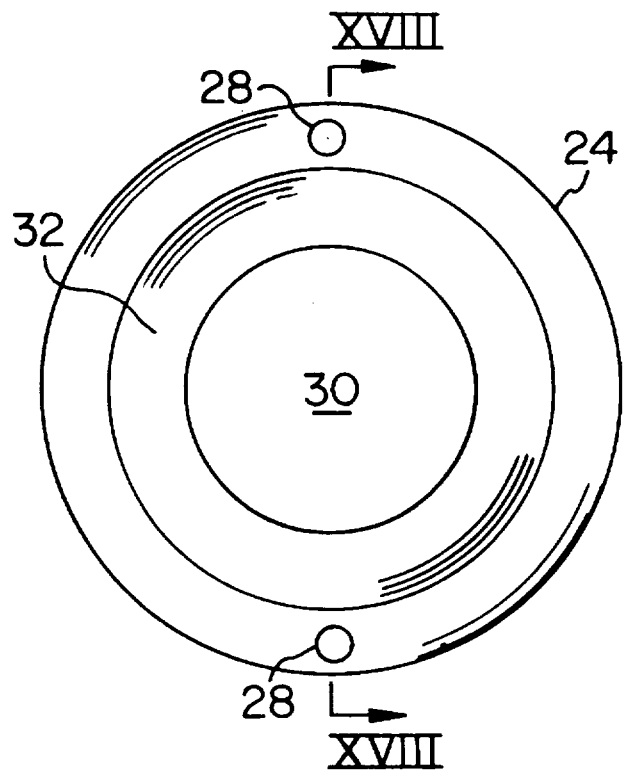
FIG. 17 is an end view of the cap member of the exhaust afterburner illustrated in FIGS. 1–3.
Figure 18:
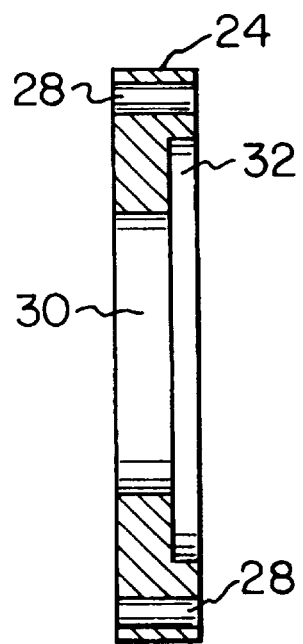
FIG. 18 is a sectional view of the cap member illustrated in FIG. 17.

In the region of the flow arrows, the pulsating inlet exhaust streams through the inlet ports have been converted into a substantially steady flow of effluent. The exhaust manifold 12 minimizes the temperature drop between the exhaust manifold inlet ports and its outlet. Accordingly, the optimum induction point for auxiliary combustion air is adjacent the outlet of the exhaust manifold 12. The exhaust afterburner 10 is inserted between the manifold connecting flange 16 and the tailpipe 14, as shown in FIGS. 1–3. The exhaust afterburner 10 includes a first and second housing 20 and 22, respectively, clamped between a pair of end caps 24 secured to the connecting flanges 16 and 18 by securing bolts 26. As shown in FIGS. 3, 17 and 18, each end cap 24 includes a pair of diametrically opposed bolt receiving openings 28 for receiving the securing bolts 26 therethrough. The end caps 24 also include a central opening 30 extending therethrough which, preferably, is at least as large as the opening in the exhaust manifold 12 and tailpipe 14 whereby the end cap 24 does not interfere with the flow of material therethrough. On one side of the end cap 24 is included a housing receiving recess 32 having a diameter substantially equal to the outer diameter of the first and second housings 20 and 22, wherein either the first or second housing 20 or 22 can be securely received in the housing receiving recess 32 of an adjacent respective end cap 24, as illustrated in FIG. 3. The exhaust afterburner 10 of the present invention is to be inserted into position by spacing the tailpipe 14 from the exhaust manifold 12 a distance sufficient to permit the insertion of the end caps 24 and the first and second housings 20 and 22 therebetween which can be securely clamped and positioned by tightening of securing bolts 26.

Figure 10:
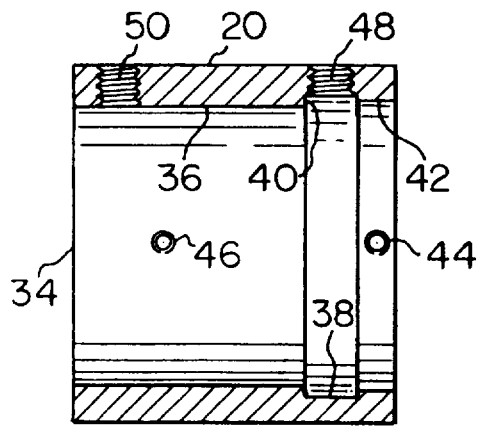
FIG. 10 is a sectional view of the first housing shown in FIG. 9.

The first housing 20 is best illustrated in FIGS. 3, 9 and 10. The first housing 20 includes an outer diameter which substantially corresponds to the housing receiving recess 32 of the end cap 24. The cylindrical first housing 20 includes a central opening 34 extending therethrough formed of three separate diameters. A venturi receiving portion 36 forms the majority of the central opening 34 extending from the rear portion of the first housing 20. An annular groove 38 forms a portion of the central opening 34 adjacent the venturi receiving portion 36. The annular groove 38 has an outer diameter greater than the diameter of the venturi receiving portion 36 thereby forming an abutting shoulder 40. A bushing receiving portion 42 is adjacent the annular groove 38 and has an outer diameter greater than the diameter of the venturi receiving portion 36 but less than the annular groove 38. The first housing 20 includes a pair of aligned, threaded set screw openings 44 and 46. Set screw opening 44 extends into the bushing receiving portion 42 while set screw opening 46 extends into the venturi receiving portion 36. A threaded bushing air opening 48 extends into the annular groove 38 and a threaded venturi air opening 50 extends into the venturi receiving portion 36. Air intake tubes 52 may be threadably secured to the air openings 48 and 50, as illustrated in FIG. 1.

Figure 11:
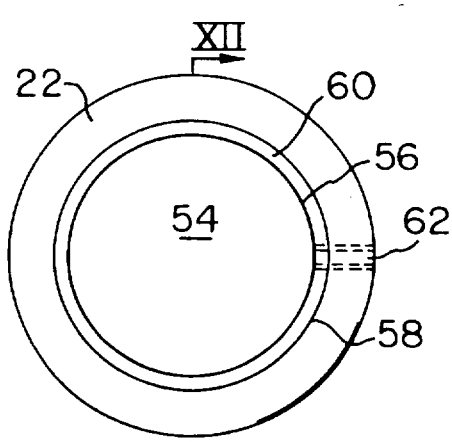
FIG. 11 is a front view of the second housing of the exhaust afterburner shown in FIGS. 1–3.
Figure 12:
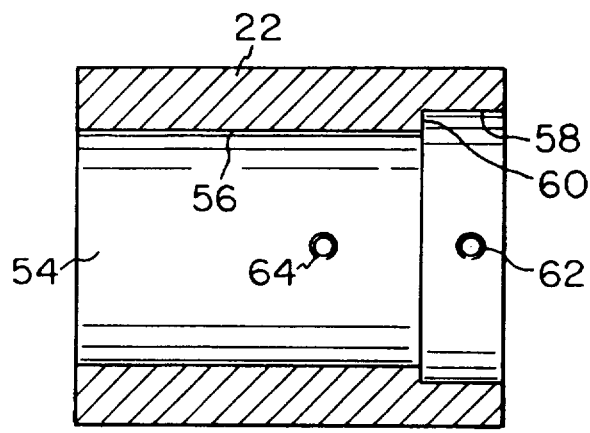
FIG. 12 is a sectional view of the second housing member shown in FIG. 11.
Figure 13:
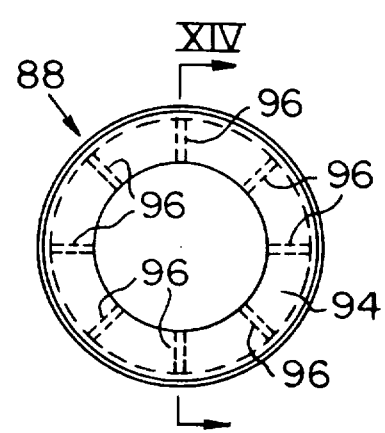
FIG. 13 is a front view of the venturi induction member of the exhaust afterburner shown in FIGS. 1–3.
Figure 14:
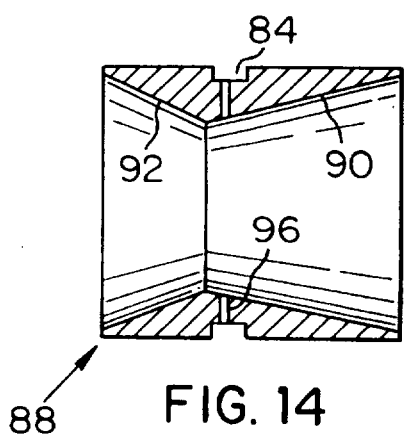
FIG. 14 is a sectional view of the venturi induction member illustrated in FIG. 13.

The second housing 22 is best illustrated in FIGS. 3, 11 and 12. The outer diameter of the cylindrical second housing 22 is substantially identical to the outer diameter of the first housing 20 which corresponds to the housing receiving recess 32 of the end cap 24. A central opening 54 extends longitudinally through the second housing 22. The central opening 54 is formed of a damping member receiving portion 56 having a first diameter and an adjacent venturi receiving portion 58 having a diameter larger than the damping member receiving portion 56 forming a shoulder 60. The venturi receiving portion 58 has a diameter substantially the same as the diameter of the venturi receiving portion 36 of the first housing 20. A pair of aligned, threaded set screw openings 62 and 64 extend through the second housing 22. The first set screw opening 62 extends into the venturi receiving portion 58 and the second set screw opening 64 extends into the damping member receiving portion 56.

Figure 15:
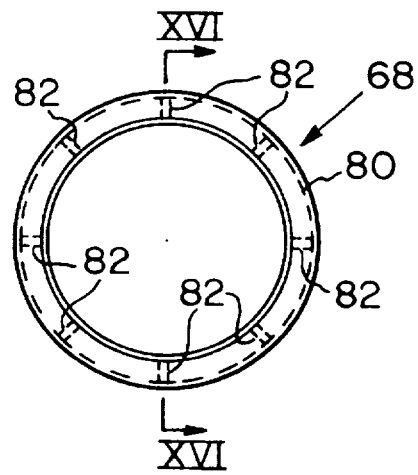
FIG. 15 is a front view of the bushing member of the exhaust afterburner illustrated in FIGS. 1–3.
Figure 16:
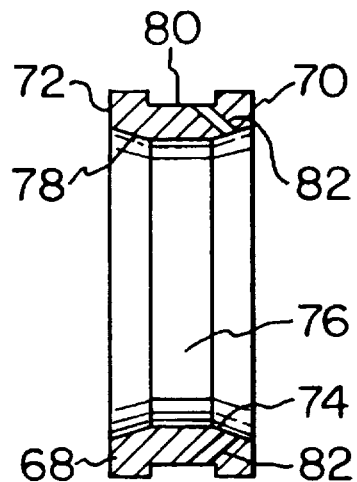
FIG. 16 is a sectional view of the bushing member illustrated in FIG. 15.

A bushing member 68 is received in the bushing receiving portion 42 of the first housing 20. The bushing member 68 is best illustrated in FIGS. 3, 15 and 16. The bushing member 68 has a front face 70 abutting against the end cap 24 and a rear face 72 abutting against the shoulder 40 formed in the first housing 20. The bushing member 68 includes a central opening extending therethrough formed of three portions. A first converging portion 74 is positioned adjacent the front face 70, a constant diameter central portion 76 adjacent the converging portion 74 and a diverging portion 78 positioned adjacent the central portion 76 and rear face 72. The outer diameter of the bushing member 68 conforms to the diameter of the bushing receiving portion 42. An annular groove 80 is positioned in the exterior of the bushing member 68 and aligns with the bushing air opening 48 of the first housing 20. A plurality of apertures 82 extends generally radially from the annular groove 80 to the converging portion 74. The apertures 82 also extend an axial distance along the bushing member 68 and are equally spaced from each other about the bushing member 68.

A venturi induction member 88 is positioned within the venturi receiving portions 36 and 58 of the first and second housings 20 and 22, respectively. The venturi induction member 88 abuts against the shoulder 60 of the second housing member and the rear face 72 of the bushing member 68. The outer diameter of the venturi induction member 88 corresponds to the diameter of the venturi receiving portions 36 and 58. The venturi induction member 88 includes a converging portion 90 and a diverging portion 92 combining to form a central opening extending therethrough. An annular groove 94 is positioned in the outer diameter of the venturi induction member 88 and aligns with the venturi air opening 50 of the first housing 20, as shown in FIG. 3. An annular array of circumferentially spaced apertures 96 extend from the annular groove 94 to substantially the venturi throat. The apertures 96 are substantially equally spaced around the circumference of the venturi induction member 88. The venturi induction member 88 and radially extending apertures 96 are designed according to U.S. Pat. No. 3,657,878 which is incorporated herein by reference. As discussed therein, the radial apertures 96 supply auxiliary combustion air helping to complete combustion of the engine exhaust gases throughout a wide range of engine operating conditions.

As shown in FIG. 3, a damping member 100 is slidably received in the second housing 22 and the venturi induction member 88. The damping member 100 includes a rear cylindrical portion 102 having an outer diameter substantially equal to the diameter of the damping member receiving portion 56 of the second housing 22. A tapered middle portion 104 is positioned adjacent the rear cylindrical portion 102 and positioned at an angle to correspond to the angle of the diverging portion 92 of the venturi induction member 88. A front cylindrical portion 106 is positioned adjacent the tapered middle portion 104 and has an outer diameter sufficient to extend through the throat of the venturi induction member 88, as illustrated in FIG. 3. A tapered nose portion 108 is positioned adjacent the front cylindrical portion 106 at the front of the damping member 100. Two different slots 110 and 112 are positioned alternately around the circumference of the damping member 100. Slots 110 extend from a tapered tail portion 114 to the tapered middle portion 104. The slots 110 are equally spaced 90° from each other about the circumference of the damping member 100 and extend substantially parallel to the centerline of the damping member 100. Each slot 112 is comprised of three portions including a rear slot portion 116 and front slot portion 118 which are parallel to the centerline of the damping member 100. A tapered slot portion 120 extends between the rear slot portion 116 and the front slot portion 118. The rear slot portion 116 begins at the tapered tail portion 114 at the same radial distance from the centerline as the slots 112. The front slot portion 118 is positioned radially closer toward the centerline of the damping member 100 than the rear slot portion 116. The front slot portion 118 extends into the tapered nose portion 108 of the damping member 100. Each slot 110 and 112 includes parallel side members which aid in the machining of the slots. A central opening 122 extends through the center of the damping member 100 and includes a forward portion 124 having a first diameter, a second portion 126 adjacent the forward portion 124 having a diameter larger than the diameter of the forward portion 124 and a diverging portion 128 adjacent the second portion 126 and extending to the tapered tail portion 114. Additionally, the damping member 100 includes a set screw groove 130 positioned in the rear cylindrical portion 102. The set screw groove 130 extends substantially parallel to the centerline of the damping member 100. A set screw extending through set screw opening 64 can be received in the set screw groove 130 preventing the damping member 100 from rotating within the second housing and providing a stop for the sliding movement of the damping member 100.

The elements of the exhaust afterburner 10 are coupled together, as discussed above, and illustrated most clearly in FIG. 3. The first and second housings 20 and 22 are clamped between the end caps 24. The bushing member 68 abuts against the shoulder 40 of the first housing 20 and the face of the end cap 24 and is secured in position by a set screw extending through set screw opening 44. The venturi induction member 88 is received in the first and second housings 20 and 22 abutting against the rear face 72 of the bushing member 68 and the shoulder 60 of the second housing 22. A set screw extending through set screw opening 62 can secure the venturi induction member 88 in position. The damping member 100 is slidably received within the second housing 22 and secured from rotation by a set screw extending through said screw opening 64 into said screw groove 130. The damping member 100 is slidable from a position with the tapered middle portion 104 abutting against the diverging portion 92 of the venturi induction member 88 to a position where the tapered middle portion 104 is spaced from diverging portion 92, as illustrated in FIG. 3. As most clearly evident in FIG. 3, the slots 110 are positioned radially from the centerline a distance greater than the radial distance of the throat of the venturi induction member 88. Consequently, with the tapered middle portion 104 abutting against the diverging portion 92, a minimum airflow passageway is created through the exhaust afterburner 10 by the combined areas defined by central opening 122 and slots 112. As the damping member 100 moves such that the tapered middle portion 104 is spaced from the diverging portion 92, additional airflow is provided through slots 110.

The damping member 100 provides for automatic relief of back pressure by sliding to an appropriate equilibrium position automatically adjusting the airflow to alleviate the back pressure condition. It is also possible to set a desired airflow by positioning the damping member 100 in an appropriate spot and further tightening of the set screw through set screw opening 62 to secure the damping member and accomplish the desired airflow. However, it preferred that the damping member 100 be allowed to slidably move to an equilibrium position. The invention may further include a condition responsive positioning device for the damping member 100 to mechanically move the damping member to the appropriate position in response to the conditions with the exhaust afterburner 10. Examples of such devices may include temperature-sensitive annular biasing springs on appropriate sides of the damping member 100. Other automated mechanical moving mechanisms may also be provided.

The bushing member 68 and the venturi induction member 88 provide for staged auxiliary air induction into the exhaust afterburner 10 of the present invention to complete the combustion of the exhaust gases. Additionally, the bushing member 68 provides a converging-diverging nozzle structure through the converging portion 74 and diverging portion 78 of its construction. The amount of air or other material provided through the air openings 48 and 50 can be Controlled by a central controller 132 based upon information received from a sensor 134 positioned within the tailpipe 14. The controller 132 may include individually controllable throttling valves coupled to the air openings 48 and 50 which may adjust the valves appropriately such as, for example, in accordance with engine acceleration and deceleration. The sensor 134 can measure the temperature, pressure or other parameters indicative of the degree of combustion within the exhaust afterburner 10 which can be used to calculate the amount of auxiliary air to be directed individually through each of the air openings 48 and 50. The use of staged air induction provides greater control of the combustion process and may be used for further reduction of noxious gases.

Although the present invention has been disclosed with particularity herein, it will be apparent to those of ordinary skill in the art that various modifications may be made to the present invention without departing from the spirit and scope thereof. The scope of the present invention should be interpreted by the full breadth and meaning of the appended claims together with all equivalents thereof.

What is claimed is:

1. An exhaust afterburner for an exhaust duct through which partially reacted gases are circulated, said exhaust afterburner comprising:

a venturi induction member having a circumferential array of radially extending apertures for inducting a reactant gas into said exhaust duct upon the passage of said partially reacted gases therethrough, said venturi induction member having an inlet end and an outlet end;

a housing surrounding said venturi induction member and having inlet and outlet ends adapted to be connected to said exhaust duct, said housing provided with an air intake opening in fluid communication with said apertures in said venturi induction member and a second air intake opening disposed adjacent to said inlet end of said venturi induction member;

a bushing positioned in said housing at said second air intake opening, said bushing having a circumferential array of radially extending apertures in fluid communication with said second air intake opening; and a means for controlling back pressure within said exhaust afterburner positioned in said housing, said means for relieving back pressure including a damping member slidably mounted within said housing and movable from a first position to a second position, whereby said first position denotes minimum back pressure relief and said second position denotes maximum back pressure relief, said damping member including a substantially cylindrical body with a plurality of slots extending longitudinally along said cylindrical body, said damping member having a tapered nose portion which extends through said venturi induction member, said damping member further including a tapered middle portion, and a cylindrical portion connected to said tapered middle portion and said tapered nose portion, wherein one-half of said slots terminate at said tapered middle portion.

2. The exhaust afterburner as set forth in claim 1 wherein said exhaust duct is coupled to an internal combustion engine, said exhaust afterburner being coupled between an outlet port of an engine exhaust manifold and an exhaust outlet pipe, said manifold and said pipe forming said exhaust duct sections.

3. The exhaust afterburner as set forth in claim 1 wherein said housing includes a first housing receiving said bushing and a portion of said venturi induction member therein, said inlet end of said venturi induction member positioned within said first housing, and said second housing positioned adjacent to said first housing.

4. The exhaust afterburner as set forth in claim 3 wherein said bushing is positioned within a recess in said second housing of said housing at said secondary air intake opening, said bushing further including a circumferentially extended groove communicating with said apertures in said bushing.

5. The exhaust afterburner as set forth in claim 1 wherein said bushing is positioned within a recess in said housing at said secondary air intake opening, said bushing further including a circumferentially extended groove communicating with said apertures in said bushing.

6. The exhaust afterburner as set forth in claim 1 wherein the other half of said slots taper at an angle substantially parallel to said tapered middle portion and then extend longitudinally into said cylindrical portion and terminate at said tapered nose portion.

7. The exhaust afterburner as set forth in claim 6 wherein each of said slots has parallel sides.

8. The exhaust afterburner as set forth in claim 7 wherein said damping member further includes a circular cross-sectional opening extending through a longitudinal axis of said damping member.

9. The exhaust afterburner as set forth in claim 8 wherein said circular cross-sectional opening decreases as it extends from an opposed base end of said damping member to said tapered nose portion.

10. The exhaust afterburner as set forth in claim 9 wherein said damping member includes an angled recess at said base end, said base end being tapered.

11. The exhaust afterburner as set forth in claim 10 wherein a rear portion of said damping member has an outer diameter substantially equal to said interior cross-sectional area of one portion of said housing.

12. The exhaust afterburner as set forth in claim 11 wherein said rear portion of said damping member includes a groove communicating with a guide screw disposed in said housing for keeping said damping member positioned within said housing, said groove defining said first and second positions.

13. The exhaust afterburner as set forth in claim 12 wherein said base end of said damping member is positioned at said outlet end of said housing, and said tapered nose portion of said damping member extends through said venturi induction member.

14. The exhaust afterburner as set forth in claim 4 wherein conduit means including throttling valves are coupled to said primary and secondary air intake openings, and means are provided for moving said valves into open and closed positions in accordance with engine acceleration and deceleration, respectively.

15. The exhaust afterburner as set forth in claim 3 wherein said bushing and said venturi induction member are held in place within said first and second halves of said housing by set screws.

16. An exhaust afterburner for an exhaust duct of an internal combustion engine, said exhaust afterburner being coupled between an outlet port of an engine exhaust manifold and an exhaust outlet pipe, said manifold and said pipe forming an exhaust duct section, said exhaust afterburner comprising:

a housing secured to said outlet port and said exhaust outlet pipe, said housing including a pair of end caps with a first housing and a second housing clamped therebetween, said first housing having a pair of spaced air intake openings extending therethrough;

a bushing positioned within said first housing at one of said air intake openings, said bushing having a circumferential array of radially extending apertures in communication with said air intake opening;

a venturi induction member, a portion of which being positioned in said first housing, the remainder positioned in said second housing, said venturi induction member positioned in said housing at the other of said air intake openings and including a circumferential array of radially extending apertures in communication with said air intake openings; and a damping member slidably received within said housing, said damping member including a substantially cylindrical body with a plurality of slots extending longitudinally along said cylindrical body with a tapered middle portion, a tapered nose portion and a cylindrical portion connecting said tapered middle portion and said tapered nose portion, wherein one-half of said slots terminate at said tapered middle portion.

17. The exhaust afterburner as set forth in claim 16 wherein the damping member is slidably positioned to adjust the amount of flow through said exhaust afterburner.

* * * * *